May 22, 1928.
G. L. PORTER
ELECTRIC PROTECTION OF TRANSFORMERS
Filed April 13, 1925
1,670,985
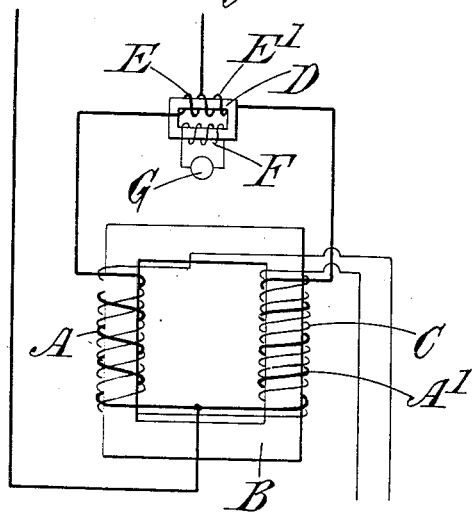
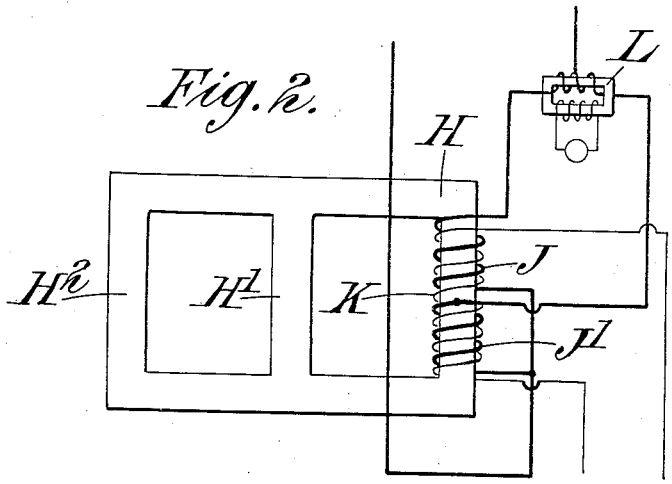

Patented May 22, 1928.

1,670,985

UNITED STATES PATENT OFFICE.

GRAHAM LEIGH PORTER, OF BENTON, ENGLAND, ASSIGNOR TO ELECTRICAL IMPROVEMENTS LIMITED, OF NEWCASTLE-UPON-TYNE, ENGLAND.

ELECTRIC PROTECTION OF TRANSFORMERS.

Application filed April 13, 1925, Serial No. 22,793, and in Great Britain May 23, 1924.

This invention relates to the electric protection of transformers. When what is known as "split conductor protection" is applied to a transformer winding, the winding is divided up into two equal coils which are connected in parallel and are wound close together on the magnetic core so as to have maximum mutual induction and protective gear is provided which operates when the normal balance between the currents carried by the two coils is disturbed. This arrangement however only serves to protect a single winding and separate protective gear must be provided to protect the second winding. Moreover the system does not give adequate protection for faults between different turns of the winding.

The present invention has for its object so to arrange the windings of a transformer that the same protective device will be operative for faults in both windings and will adequately protect the transformer against faults between the individual turns of a winding.

According to this invention one of the transformer windings is divided into two equal coils which are connected in parallel and are disposed on separate limbs of the magnetic core or on separate parts of the same limb so as to have a comparatively small amount of mutual induction, and a second winding is disposed symmetrically with respect to the two coils of the first winding, a protective device being so connected to the two coils of the first winding that it will act to cut out the transformer when the normal balance which exists between the currents carried by these two coils is disturbed.

It will be appreciated that the invention is especially suited for application to transformers of large size wherein on account of the heavy currents carried it is desirable in any case to divide up one of the windings into coils connected in parallel, but the invention is also applicable to other types of transformer.

Figures 1 and 2 of the accompanying drawings illustrate diagrammatically preferred arrangements respectively for a single phase transformer and for a three-phase transformer.

In the single phase transformer shown in Figure 1, one winding consists of two equal coils A A' connected in parallel and wound on separate limbs of a common iron circuit B, the resistance and self-induction of the two coils being made substantially the same so that they will normally carry equal currents. The second winding consists of a single coil C disposed symmetrically with respect to the two coils A A' and preferably wound on the same two limbs of the magnetic core B. The second winding C must be so arranged as to satisfy two conditions, namely, that its inductive effect as a whole on one of the two coils of the first winding is the same as that on the other coil, and that the inductive effects of any unsymmetrical part of it on the two coils are different.

The first of these conditions ensures that the normal flow of current in the second winding C will not affect the equality of the currents in the two coils A A' of the first winding. Any fault occurring in either of the two coils A A' will however disturb this balance of current. The second condition ensures that a fault in a part of the second winding C will result in a difference in the currents carried by the two coils A A' of the first winding. If a fault occurs in this winding C (other than at its mid-point or between points symmetrically placed with respect to the winding A A'), it is true that the same current will flow through both branches of the winding C, but the number of turns in each branch through which it will flow will be different. Consequently the inductive effects on the two coils A and A' will be different and the balance will be disturbed. With this arrangement the balance of currents in the two coils A A' is disturbed by any fault between individual turns in either winding with the exception of faults between equipotential points in the first winding and faults between points in the second winding which are symmetrically placed with regard to the centre of that winding. Such faults, however, which do not disturb the balance are most unlikely to occur as the corresponding points in the windings are not adjacent to each other.

Any suitable form of protective device, which will operate on inequality between two currents, may be employed, but one convenient arrangement consists of a current transformer D having two opposed primary windings E E' connected in series with the two coils A A' of the first winding of the transformer to be protected, the secondary F of this current transformer being connected to a tripping relay G. This current transformer D can be conveniently arranged within the case of the main transformer.

It will be seen that if tapping connections are provided in the windings of the main transformer, they must be duplicated so as to maintain the balance of currents in the two coils of the first winding.

In the three-phase transformer shown in Figure 2, each phase is arranged in a manner somewhat similar to that described for the single phase transformer shown in Figure 1. In this case however the magnetic core has conveniently three main limbs H H' H², one for each phase, the two parallel coils J J' of the first winding in a phase being disposed on separate parts of one limb H. The second winding in each phase consists as before of a single coil K disposed on one limb H of the core symmetrically with regard to the two coils J J' of the first winding in that phase. For the sake of simplicity only one phase of each of the windings is shown in the drawings but it will be understood that the other two phases are disposed respectively on the limbs H' H² of the core in a manner similar to that shown for the windings on the limb H. A separate protective current transformer L is provided for each phase and is conveniently arranged in the manner above described for the protection of a single phase transformer. The outgoing leads in the first and in the second windings of the various phases may be connected in star or in any other suitable manner.

It will be understood that the arrangements above described have been given by way of example only and that modifications may be made without departing from the scope of the invention.

What I claim as my invention and desire to secure by Letters Patent is:—

1. The combination of a transformer having one winding divided into two coils connected in parallel and normally carrying equal currents and a second winding so arranged that its inductive effects on the two coils are equal under normal conditions but are unequal when a fault occurs in the second winding other than at its mid-point, and a protective device associated with said first winding and operative when the normal balance of current between the two coils is disturbed.

2. The combination of a transformer having one winding divided into two equal coils which are connected in parallel and have a normal balance of current and are disposed on separate parts of the transformer core so as to have a comparatively small amount of mutual induction and a second winding disposed symmetrically with respect to the two coils of the first winding, and a protective device associated with said first winding and operative when the normal balance of current between the two coils is disturbed.

3. The combination of a three-phase transformer comprising a magnetic core having three limbs one for each phase, one winding having in each phase two equal coils which are connected in parallel and have a normal balance of current and are disposed on separate parts of the same limb, and a second winding having in each phase a coil disposed symmetrically with respect to the two coils of the first winding, and a protective device for each phase associated with said first winding and operative when the normal balance of current between the two coils of the first winding in that phase is disturbed.

4. The combination of a transformer having one winding divided into two coils connected in parallel and normally carrying equal currents and a second winding so arranged that its inductive effects on the two coils are equal under normal conditions but are unequal when a fault occurs in the second winding other than at its mid-point, and a protective device comprising a current transformer having two opposed primary windings in series respectively with the two coils and a tripping relay in circuit with the secondary winding of this current transformer.

5. The combination of a three-phase transformer comprising a magnetic core having three limbs one for each phase, one winding having in each phase two equal coils which are connected in parallel and are disposed on separate parts of the same limb, and a second winding having in each phase a coil disposed symmetrically with respect to the two coils of the first winding, and a protective device for each phase comprising a current transformer having two opposed primary windings in series respectively with the two coils of the first winding of the main transformer in that phase and a tripping relay in circuit with the secondary winding of this current transformer.

6. The combination of a transformer having one winding divided into two coils connected in parallel having a normal balance of current, and a second winding having a normal definite inductive effect on each coil, whereby a fault occurring in said second winding other than at its midpoint will alter its relative inductive effect on the two coils, and a protective device associated with said first winding and operative when the normal balance of current between the two coils is disturbed.

In testimony whereof I have signed my name to this specification.

GRAHAM LEIGH PORTER.